United States Patent Office.

P. H. VANDER WEYDE, OF PHILADELPHIA, PENNSYLVANIA.

Letters Patent No. 62,092, dated February 12, 1867.

---

IMPROVED LUBRICATING OIL.

---

The Schedule referred to in these Letters Patent and making part of the same.

---

Be it known that I, P. H. VANDER WEYDE, of Philadelphia, State of Pennsylvania, after a long series of experiments on that subject, have succeeded to find the proper substances and the method of treating them, so as to manufacture a Superior Lubricator for Machinery; and I do hereby declare that the following is a full and exact description thereof.

The nature of my invention consists in producing an oil which possesses all the different requisites for a good lubricator, and none of the defects of other oils, which requisites I will enumerate here, as their knowledge is necessary to the right understanding of the process of manufacturing a perfect lubricator: first, the lubricator must not freeze nor solidify at the temperature of our coldest winter days, say 10° below zero, Fahrenheit, as is the case with sperm and lard oil, which freeze already at 40° above zero; second, it must not dry by oxidation or otherwise, and form a gummy crust like linseed oil, which does not freeze at 20°, but is a drying oil; third, it must not have been treated with acids, which rob all oils of their smoothness, as is the case with heavy kerosene and some vegetable oils in use; fourth, it must not naturally contain any fatty acids, combined and neutralized by glycerine, because, when turning rancid, these fatty acids become free and act chemically on brass, etc.; they corrode the machinery, as is the case with all the animal and vegetable fats and oils; fifth, it must be pure and perfectly transparent, and contain no gritty, earthy, or mineral matter, which will attack fine machinery, as is the case with crude petroleum; sixth, it must not evaporate and leave the parts dry, as is the case with kerosene, paraffine oil, coal oil, and, in general, all distilled oils, which, being products of distillation or condensed vapors, will evaporate again; seventh, it must not be too thin, but thick and adhesive, and stick to the lubricated parts, not being removed by mere friction, as is the case with heavy kerosene or paraffine oils, which drain entirely off and leave the parts dry.

I have found the crude petroleum naturally to answer perfectly to the four first requisites, and I have succeeded by proper treatment to make it answer the other requisites also, thus producing that great desideratum of our age, a perfect lubricator.

In order to enable others to make use of my invention, I will describe it minutely.

I cause the crude petroleum to satisfy the fifth requisite by simply filtering it through suitable material, as has already been practised before, for which purpose my percolator, patented March, 1866, or any other filtering machine, may be employed. I cause the oil to satisfy the sixth requirement by evaporating the two volatile parts in a water or steam bath, taking care not to raise the temperature above 300°, as in that case a destructive change sets in and tar is formed, which, containing very fine but gritty free carbon, is an imperfect lubricator. In the case of treating heavy petroleum of 30° specific gravity, or thereabout, I let the vapor escape, but in case of treating the light petroleum of about 40°, it is profitable to condense and collect the escaping vapors of naphtha and kerosene, as they constitute more than fifty per cent. of the oil. I carry this evaporation on till the oil has been reduced to a specific gravity of 26°. I cause the oil to satisfy the seventh requirement by boiling it with animal matter, like blood, watery extract of bones, hoofs, skins, or other similar substances containing fibrin, albumen, gelatine, marrow, etc., and afterwards dissolving in it a small quantity of pure common resin; by this treatment the oil becomes unctuous and adhesive, without being in the least gummy. For certain purposes the resin may be omitted. The evaporation of the oil and the boiling process with animal matter may be combined and performed by the same operation. When the evaporation is accomplished in a closed vessel, as is necessary when treating light oils, it may be promoted by a current of cold or warm air passed by suitable means over or through the oil.

What I claim, and wish to secure by Letters of Patent, is—

The manufacture of illuminating or burning oil, and a superior lubricating oil, from common petroleum, combining the filtering, evaporating at a low temperature, and thickening processes above described.

In testimony whereof I have signed my name to this specification in the presence of two subscribing witnesses.

P. H. VANDER WEYDE.

Witnesses:
　ADOLF OTT,
　WM. ROBINSON.